United States Patent Office 2,757,154
Patented July 31, 1956

2,757,154

ACRYLONITRILE-VINYL PYRIDINE COPOLYMER SOLUTIONS

Ralph Gardner Beaman, Buffalo, N. Y., assignor to E. I. du Pont de Nemours & Company, Wilmington, Del., a corporation of Delaware No Drawing. Application August 9, 1949,
Serial No. 109,404

6 Claims. (Cl. 260—30.2)

This invention relates to new compositions of matter and shaped articles produced therefrom. More particularly, this invention relates to organic solvent solutions of acrylonitrile copolymers, i. e., copolymers and interpolymers of acrylonitrile in which at least 85% and up to 95% by weight of the polymer is acrylonitrile and to the production of shaped articles from said solutions of said polymers.

Copolymers and interpolymers of acrylonitrile with other polymerizable substances, for example, vinyl or acrylic compounds, in which at least 85% and up to 95% by weight of the polymer is acrylonitrile, have been known for some time and recognized as possessing desirable physical and chemical properties including toughness and insolubility in and insensitivity to common organic solvents such as methyl or ethyl alcohol, acetone, ethyl ether, ethyl acetate, hydrocarbon solvents, chlorinated hydrocarbons and the like. Because of these facts, numerous attempts have been made to form these polymeric materials into yarns, films and other shaped articles.

A number of solvents have been found for polyacrylonitriles as exemplified in U. S. Patents 2,404,714— 2,404,727. However, in striving for the production of high quality products, such as a high quality yarn, it has been found that many of the known solvents have disadvantages even though they are effective and useful solvents. For example, the use of dimethyl formamide, which is an excellent and useful solvent, leads, in dry spinning techniques, to the production of colored articles and means, such as stabilizing or bleaching, are required to produce articles free from undesirable color. Similarly, such a solvent as N,N-dimethylmethoxyacetamide is expensive and somewhat higher boiling than is desired for economic dry spinning procedures.

It is, therefore, an object of this invention to dissolve a copolymer or interpolymer of acrylonitrile in which at least 85% and up to 95% by weight of the polymer is acrylonitrile in a solvent which does not react with or decompose or discolor the polymer and which may be substantially completely removed at relatively low temperatures from the structures formed of such a solution.

It is another object of this invention to produce a solution of a copolymer or interpolymer of acrylonitrile in which at least 85% and up to 95% by weight of the polymer is acrylonitrile in a solvent which does not react with or decompose or discolor the polymer, the solution being suitable for the formation of commercially useful, void free articles of acrylonitrile polymers, for example yarns which are suitable as textile yarns and films which are suitable as wrapping tissues.

It is another object of this invention to produce a solution of a copolymer or interpolymer of acrylonitrile containing 85% to 95% by weight of acrylonitrile in a volatile organic solvent which solution is stable over extended periods of time and is eminently suited for use in the manufacture of shaped articles such as yarns, films, tubes, straws, artificial horsehair, bristles and ribbons, or when highly concentrated, for use in the manufacture of molded articles.

It is a still further object of this invention to produce shaped articles and structures of copolymers or interpolymers of acrylonitrile in which at least 85% and up to 95% by weight of the polymer is acrylonitrile.

It is still another object of this invention to produce a shaped article or structure of copolymers or interpolymers of acrylonitrile in which at least 85% and up to 95% by weight of the polymer is acrylonitrile, for example, a yarn, film, tube, bristle or the like which is tough, flexible, tenacious and free from voids.

Other objects of the invention will appear hereinafter.

The objects of this invention are accomplished in general by dissolving copolymers or interpolymers of acrylonitrile containing 85% to 95% by weight of acrylonitrile in a solvent selected from the group consisting of N-methyl-N-ethylacetamide and N,N-dimethylpropionamide and N-acetyl piperidine. The following examples in which parts, proportions and percentages are by weight illustrate applications of the principles of the invention.

EXAMPLE I

Ten parts of a 95/5 copolymer of acrylonitrile with 2-vinyl pyridine was slurried at room temperature in 50 parts of N-acetyl piperidine. The mixture was heated with stirring to produce a clear, heavy viscous solution suitable for spinning. In the same way, a solution was obtained using a 90/10 copolymer of acrylonitrile with methyl vinyl ketone.

EXAMPLE II

Ten parts of a 95/5 copolymer of acrylonitrile with styrene was slurried at room temperature in 100 parts of N-acetyl piperidine. The mixture was heated with stirring and then cast on a smooth glass plate. The polymer was precipitated and solvent removed by washing with water to leave a film. In the same way, a film was obtained using a 90/10 copolymer of acrylonitrile with methacrylonitrile.

EXAMPLE III

Fifteen parts of a 90/10 copolymer of acrylonitrile with isobutylene was slurried at room temperature in 85 parts of N,N-dimethyl propionamide. The mixture was heated with stirring to produce a viscous solution. In the same way a solution was obtained using a 95/5 copolymer of acrylonitrile with 2-vinyl pyridine.

EXAMPLE IV

Fifteen parts of a 95/5 copolymer of acrylonitrile with 2-vinyl pyridine was slurried in 100 parts of N-methyl-N-ethylacetamide and then heated with stirring to give a clear viscous solution. This was poured on a smooth glass plate and the solvent removed by heating at 100° C. to leave a clear tough film. In the same way, a film was obtained using a 95/5 copolymer of acrylonitrile with methacrylic acid.

The solvents of this invention are amides and specifically are amides with secondary amines. The secondary amines are, methylethylamine, dimethylamine and piperidine (pentamethyleneimine). While the solvents of this invention are excellent solvents for the acrylonitrile copolymers, they are not solvents for the homopolymer.

The copolymers of acrylonitrile for use in this invention can be prepared in any suitable manner such as those methods disclosed in U. S. Patent 2,160,054 or in U. S. Patents 2,404,714–2,404,727. The invention comprehends dissolving of acrylonitrile copolymers and interpolymers formed by polymerizing acrylonitrile with other polymerizable substances such as, for example, compounds containing 1 or more ethylenic linkages which may include styrene, dimethyl itaconate, methyl vinyl ketone, ethyl vinyl sulfone, methacrylonitrile, acrylic acid, vinyl pyridines, such as 2-vinylpyridine, vinyl acetate, vinyl chloride, isobutylene and butadiene. The solvents of this invention are eminently satisfactory for use with those copolymers which contain a large amount of acrylonitrile, for example, polymers that contain in the polymer molecule from 85% to 95% by weight of acrylonitrile. The solvent may be used in forming useful compositions with polymers having an average molecule weight between 15,000 and 250,000 as determined by viscosity data using the Staudinger equation. Such polymers are generally used in the manufacture of yarns and filaments. Generally, polymers having a molecular weight between 40,000 and 150,000 are preferred.

The above described solutions of the acrylonitrile copolymers may be shaped in the form of filaments, yarns, films, tubes and like structures by apparatus and processes generally known in the art, the detailed operating conditions being suitably modified. The solutions are stable at room temperature and at elevated temperatures and may be used in producing shaped articles by extruding these solutions into an evaporative or coagulating medium. Film formation is readily achieved by casting the solution onto a smooth surface such as an endless steel band under the smoothing action of a doctor knife. The solvent may be removed either by the dry or evaporative method or by the wet method which utilizes a liquid coagulating bath. Similarly, the solutions may be used in the manufacture of moulded articles or as lacquer or coating compositions, these being especially useful in the coating of wire and electrical parts where high chemical and electrical resistance is important. In the preparation of shaped articles, solutions having a viscosity of from about 25 to 750 poises are preferred.

In addition to acting as solvents the solvents of this invention can also be used as plasticizing agents when present in small amounts. Non-solvent softeners such as glycerol may also be incorporated.

In preparing the compositions of this invention small amounts of the solvent may be used, as, for example, 40% to 65% to produce compositions suitable for melt spinning. Smaller amounts, such as 5% to 40% or more, may be employed to produce compositions useful in obtaining molded articles. In producing solutions for dry spinning or wet spinning the amount of solvent ranges preferably from 75% to 90%.

The provision of the novel solvents of this invention is highly advantageous in that better slurry of the polymer at room temperature is obtained than heretofore possible with known solvents. This eliminates the necessity for heat treating the polymer to harden it in order to get improved slurrying so that rapid solution is possible. The stability of the solvents of this invention is sufficiently great in regard to color formation brought about by metal salts or by the development of impurities in the solvent at elevated temperatures to permit their use in the various spinning techniques. The solvents of this invention are higher boiling and permit higher spinning speeds in melt spinning than such a solvent as N,N-dimethylformamide. The compositions of this invention may be used in melt spinning following the procedure outlined in my copending case. The possibilities for the commercialization of acrylonitrile copolymers containing at least 85% and up to 95% acrylonitrile are decidedly enhanced by this invention.

The compositions of this invention may be used to produce the following:

*Outdoor uses*

| | |
|---|---|
| Auto tops | Life belts and preservers |
| Balloon fabric | Mosquito netting |
| Belts for combines | Rainwear |
| Fire hose covers | Outdoor sewing thread |
| Horse harness | Sporting equipment |
| Harvester aprons | Hammocks |
| Lawn mower baskets | Sea bags |

*Staple*

| | |
|---|---|
| Blankets | "Felt base" linoleum |
| Paper makers felt | |

*Miscellaneous*

| | |
|---|---|
| Laundry net | Cable braid |
| Braided thread | Tablecloths |

*Flat fabrics*

| | |
|---|---|
| Crepe fabrics | Curtains |
| Airplane head rest | Shades |
| Diaphragms | Ventubes (mining) |
| Lamination | Lampshades |
| Leader cloths | Bookbinding |
| RR canvas | Cloth top sport shoes |
| Shower curtains | Camera bellows |
| Tracing cloth | Sacking |
| Varnished thread | Tapestry |
| Varnished silk | Mattress covers |

*Tapes*

| | |
|---|---|
| Zipper | Venetian blind tapes |
| Electrical | Watch straps |

*Rubber covered*

| | |
|---|---|
| Coated diaphragms | Conveyor belt |

It was not expected that the solvents of this invention would be solvents in view of U. S. 2,404,714 which pointed out that a certain carbon to nitrogen ratio was essential. The solvents of this invention do not have the stated ratio. Further, related compounds are ineffective. For example, N,N-diethylacetamide is a non-solvent. The polymers of this invention possessing the aforesaid properties not possessed by other polymers require specific, unusual solvents.

Any departure from the procedure described herein which conforms to the principles of the invention is intended to be included within the scope of the claims below.

I claim:

1. A new composition of matter comprising a copolymer of acrylonitrile and a vinyl pyridine, containing in the polymer molecule 85% to 95% by weight of acrylonitrile and correspondingly 5% to 15% of a vinyl pyridine dissolved in a solvent selected from the group consisting of N-methyl-N-ethylacetamide, N,N-dimethylpropionamide and N-acetyl piperidine.

2. The composition of claim 1 in which the solvent is N-methyl-N-ethylacetamide.

3. The composition of claim 1 in which the vinyl pyridine is 2-vinylpyridine.

4. The composition of claim 3 in which the solvent is N-methyl-N-ethylacetamide.

5. The composition of claim 3 in which the solvent is N,N-dimethyl propionamide.

6. The composition of claim 3 in which the solvent is N-acetyl piperidine.

References Cited in the file of this patent

UNITED STATES PATENTS

| | | |
|---|---|---|
| 1,986,854 | Reid | Jan. 8, 1935 |
| 2,404,714 | Latham | July 23, 1946 |
| 2,503,245 | Coover | Apr. 11, 1950 |
| 2,531,407 | D'Alelio | Nov. 28, 1950 |
| 2,583,327 | D'Alelio | Jan. 22, 1952 |
| 2,687,393 | Trementozzi | Aug. 24, 1954 |